United States Patent [19]

Van Vlerken et al.

[11] Patent Number: 5,739,986
[45] Date of Patent: Apr. 14, 1998

[54] MAGNETIC TAPE RECORDING/ REPRODUCING DEVICE COMPRISING A HEAD-DRUM UNIT USING CAPACITIVE AND INDUCTIVE COUPLINGS TO TRANSFER SIGNALS FROM AND TO THE WRITE AND READ HEADS

[75] Inventors: Johannes J. L. M. Van Vlerken; Theodorus P. H. G. Jansen, both of Eindhoven, Netherlands

[73] Assignee: U.S. Philips Corporation, New York, N.Y.

[21] Appl. No.: 767,595

[22] Filed: Dec. 9, 1996

[30] Foreign Application Priority Data

Dec. 14, 1995 [EP] European Pat. Off. .............. 95203485

[51] Int. Cl.⁶ ...................................................... G11B 5/52
[52] U.S. Cl. ........................................................ 360/108
[58] Field of Search ................................. 360/108, 107, 360/64

[56] References Cited

U.S. PATENT DOCUMENTS

| 4,517,615 | 5/1985 | Hino | 360/108 |
| 4,609,960 | 9/1986 | Fujioka | 360/107 |
| 4,642,711 | 2/1987 | Yunoki et al. | 360/108 |
| 4,829,401 | 5/1989 | Vranken | 360/108 |
| 4,870,522 | 9/1989 | Lelandais | 360/108 |
| 4,926,273 | 5/1990 | Tabuchi et al. | 360/108 |
| 5,126,906 | 6/1992 | Ohji et al. | 360/108 |
| 5,276,565 | 1/1994 | Higashiyama et al. | 360/108 |

*Primary Examiner*—Craig A. Renner
*Attorney, Agent, or Firm*—Edward W. Goodman

[57] ABSTRACT

A magnetic-tape recording/reproducing device of the helical-scan type includes a head drum unit having first and second signal transmission systems arranged between the stationary part and a rotary magnetic head. The first transmission system transmits signals by an inductive coupling. The second transmission system transmits signals by a capacitive coupling.

20 Claims, 2 Drawing Sheets

5,739,986

MAGNETIC TAPE RECORDING/REPRODUCING DEVICE COMPRISING A HEAD-DRUM UNIT USING CAPACITIVE AND INDUCTIVE COUPLINGS TO TRANSFER SIGNALS FROM AND TO THE WRITE AND READ HEADS

BACKGROUND OF THE INVENTION

1. Field of the Invention

The invention relates to a magnetic-tape recording/reproducing device of the helical-scan type, comprising a head drum unit having a rotatable supporting member and a stationary part.

The invention further relates to a head-drum unit for use in a magnetic-tape recording/reproducing device of the type defined in the opening paragraph.

2. Description of the Related Art

Magnetic-tape recording/reproducing devices of the helical-scan type are used, for example, for recording and reproducing pictures (video recorders; VCR) and for recording and reproducing sound (digital audio recorders; DAT). Such magnetic-tape recording/reproducing devices have a head-drum unit comprising one or more heads for writing and/or reading signals in tracks on a magnetic tape. The heads rotate about the axis of the head-drum unit and thus describe a helical path with respect to the magnetic tape. The head-drum unit further comprises means for signal transmission between the stationary part of the head-drum unit and the rotary head or heads on the supporting member. An example of such a signal transmission unit is described in U.S. Pat. No. 4,829,401 (PHN 12302).

SUMMARY OF THE INVENTION

It is an object of the invention to provide a magnetic-tape recording/reproducing device having improved means for signal transmission. It is a further object of the invention to provide a head-drum unit for use in such a magnetic-tape recording/reproducing device.

To this end the magnetic-tape recording/reproducing device in accordance with the invention is characterized in that the head-drum unit comprises first and second means for signal transmission between the stationary part and a magnetic head arranged on the supporting member, the first means for signal transmission transmits signals by means of a substantially inductive coupling, and the second means for signal transmission are adapted to transmit signals by means of a substantially capacitive coupling. The invention is based on the recognition of the following facts. The desire for continual miniaturization has led to a reduction of the space available in the head-drum unit for the means for signal transmission between the stationary part and a head on the rotatable supporting member. Without any further measures, a reduction of the size of the means for signal transmission will lead to a reduced quality and increased crosstalk between the signal paths formed in these signal transmission means. The measures in accordance with the invention mitigate the drawbacks of the reduction in size of the signal transmission means, in that the signal path are realized by means of different coupling methods, i.e., the capacitive coupling and the inductive coupling proposed in accordance with the invention.

An embodiment of the magnetic-tape recording/reproducing device in accordance with the invention is characterized in that the rotary supporting member carries at least a first and a second magnetic head, the first magnetic head is coupled to the first means for signal transmission and the second magnetic head is coupled to the second means for signal transmission, one of the heads being a read head and the other head being a write head. A preferred further embodiment is characterized in that the first magnetic head is a write head and the second magnetic head is a read head. If the magnetic-tape recording/reproducing device is constructed for simultaneously writing and reading signals on/from the magnetic tape, for example, as in off-tape monitoring or in the case of partial substitution of the signals on the tape, it is very important that crosstalk between the read and write signal paths in the signal transmission means be particularly low. In particular, there is a risk of crosstalk of the write signals to the read signals because the write signals applied to a write head are several times as large as the read signals obtained from a read head. It is known that the adverse effects of this crosstalk can be reduced by electronically amplifying the read signals before they are applied to the signal transmission means. For this purpose, signal amplifier circuits have to be accommodated on the rotary supporting member. These known measures lead to a substantial increase in cost price, particularly because a transmission of power to the rotary supporting member is required in order to power the signal amplifier circuits. The measures in accordance with the invention reduce the crosstalk, and hence, the adverse effects thereof, in a substantially cheaper manner.

A further embodiment, in which the rotary supporting member has a first wall surface and a second wall surface and the stationary part of the head-drum unit has a third wall surface and a fourth wall surface, is characterized in that the first means for signal transmission comprise a rotor winding arranged on the first wall surface and a stator winding arranged on the third wall surface in such a manner that the rotor winding faces the stator winding with which it cooperates, and the second means for signal transmission comprise a rotor capacitor plate arranged on the second wall surface and a stator capacitor plate arranged on the fourth wall surface in such a manner that the rotor capacitor plate faces the stator capacitor plate with which it cooperates. A rotor winding and a stator winding which cooperates therewith together constitute means for signal transmission by means of inductive coupling. These means, together with a rotor core and a stator core made of ferrite, are usually referred to as a rotary transformer. A rotor capacitor plate and a stator capacitor plate which cooperates therewith together form means for signal transmission by means of capacitive coupling, i.e., a rotary capacitor. The capacitor plates are usually mounted on insulators in order to preclude electrical contact with the enclosure of the head-drum unit. For signal transmission between the stationary part of the head-drum unit and one head on the rotary supporting member two rotary capacitors are required, each having a rotor plate and a stator plate. However, if the signals for a plurality of heads are transmitted via rotary capacitors the signal return paths of these heads may utilize one common rotor capacitor plate and/or one common stator capacitor plate. This measure makes it possible to use a cheaper and smaller construction. An embodiment which employs only a common stator capacitor plate is most favorable in view of the generation of crosstalk by the impedances in the signal return paths.

Herein, the term "capacitor plate" is used in the meaning which is customary in electrical engineering and is not limited to flat conductors, as will be illustrated in the following description and the drawings.

Further preferred embodiments are characterized in that the first and the third wall surfaces lie in substantially concentric cylindrical imaginary surfaces and/or the second and the third wall surface lie in substantially concentric cylindrical imaginary surfaces, and/or are characterized in that the first and the third wall surfaces lie in substantially parallel imaginary surfaces perpendicular to the direction of rotation of the rotary supporting member and/or the second and the third wall surfaces lie in substantially parallel imaginary surfaces perpendicular to the direction of rotation of the rotary supporting member. These embodiments include, for example, a combination of a rotary transformer comprising two facing disc-shaped ferrite cores which carry cooperating windings on the two facing wall surfaces, and a rotary capacitor comprising two nested concentric cylindrical insulators whose facing wall surfaces carry cooperating capacitor plates. These embodiments also include, for example, a combination of a rotary transformer comprising two facing concentric cylindrical ferrite cores whose facing wall surfaces carry cooperating windings, and a rotary capacitor comprising two facing disc-shaped insulators whose facing wall surfaces carry cooperating capacitor plates.

Further preferred embodiments are, moreover, characterized in that the imaginary surfaces, in which the first and the second wall surfaces lie, substantially coincide, and/or the imaginary surfaces in which the third and the fourth wall surfaces lie, substantially coincide. Such embodiments include, for example, a combination of a rotary transformer and a rotary capacitor, comprising two facing disc-shaped ferrite cores whose facing wall surfaces carry cooperating windings and cooperating capacitor plates, arranged on insulators, if necessary. These embodiments also include a combination of a rotary transformer and a rotary capacitor, comprising two nested concentric cylindrical ferrite cores whose facing wall surfaces carry cooperating windings and cooperating capacitor plates, arranged on insulators, if necessary.

It is to be noted that herein the term "imaginary surface" is used in a mathematical sense and that wall surfaces disposed in line consequently lie in coincident imaginary surfaces.

An embodiment of the invention is characterized in that the head-drum unit comprises a rotor core and a stator core of a ferromagnetic material, the rotor core serves as a support for the rotor windings and the stator core as a support for the stator windings, and the rotor core serves as a support for the rotor capacitor plate and/or the stator core serves as a support for the stator capacitor plate. In this embodiment, an insulator with capacitor plates can be made, for example, from a composite material consisting of a flexible electrically insulating foil provided with a thin metal layer. Such composite materials are known and are commonly used in electrical equipment. However, an insulator having a capacitor plate of this composite material is flexible and therefore requires a support in order to obtain the required stiffness and non-deformability. In the present embodiment of the invention, an insulator with a capacitor plate thus obtained is secured to at least a part of the rotor core or stator core, for example, by means of an adhesive, so that no additional supporting body is required and money and space are saved. From U.S. Pat. No. 4,829,401 (PHN 12302), it is known that the windings for the inductive transmission can also be made of said composite material. In the present embodiment of the invention, the capacitor plates and windings can therefore be manufactured together from the composite material.

A further preferred embodiment is characterized in that at least a part of the rotor core and/or the stator core is made of a substantially non-conductive ferromagnetic material, and the rotor capacitor plate and the stator capacitor plate are made of a conductive material applied, at least partly, to the substantially non-conductive ferromagnetic material. By making a core at least partly of a non-conductive material, a capacitor plate can be formed directly on the core, for example, by sputtering or vapor-deposition, without an interposed insulating foil. A known non-conductive ferrite is, for example, NiZn.

If a capacitor plate is arranged in such a manner that magnetic field lines, for example, from the rotary transformer, extend through the capacitor plate, eddy currents will be produced in this plate. These can be remedied by providing the capacitor plate with a given pattern of conductive and insulating portions.

A further preferred embodiment is characterized in that the first means for signal transmission comprises at least two rotor windings and two stator windings, and a rotor capacitor plate is interposed between the rotor windings, and a stator capacitor plate is interposed between the stator windings. When two or more windings are arranged on one ferrite core, crosstalk will occur between these windings. In a rotary transformer, where the different windings on the same ferrite core form parts of different signal paths, this crosstalk is undesirable. The present preferred embodiment aims at achieving the same favorable effect by the arrangement of one or more capacitor plates between the various windings, in such a manner that these capacitor plates behave as short-circuit rings for the inductive signal transmission means.

According to the invention, a head-drum unit for use in a magnetic-tape recording/reproducing device, comprising a rotatable supporting member and a stationary part, is characterized in that the head-drum unit comprises first and second means for signal transmission between the stationary part and a magnetic head arranged on the supporting member, the first means for signal transmission transmitting signals by means of a substantially inductive coupling, and the second means for signal transmission transmitting signals by means of a substantially capacitive coupling. Such a head-drum unit is particularly suited for miniaturization in that it mitigates the drawbacks caused by the reduction in size of the signal transmission means, such as a reduced quality and an increased crosstalk between the signal paths formed in these signal transmission means. For this purpose, in accordance with the invention, the signal paths are realized by means of different coupling method, i.e., the proposed capacitive coupling and inductive coupling.

It is to be noted that although reference is made to a magnetic-tape recording/reproducing device of the "helical scan" type, the invention relates to any magnetic-tape recording/reproducing device using rotary heads to write and read tracks, which tracks are inclined relative to the direction of transport of the magnetic tape. Such devices consequently also include devices of the "transversal scan" type and devices of the "arcuate scan" type.

It is to be noted that U.S. Pat. No. 4,870,522 describes a head-drum unit which employs capacitive coupling for signal transmission between the stationary part and the rotatable supporting member. However, this patent does not disclose the use of different coupling methods such as the capacitive coupling and inductive coupling proposed in accordance with the present invention.

BRIEF DESCRIPTION OF THE DRAWINGS

The invention will be described in more detail, by way of example, with reference to the drawings. In the drawings.

DETAILED DESCRIPTION OF THE PREFERRED EMBODIMENTS

Figure 1:
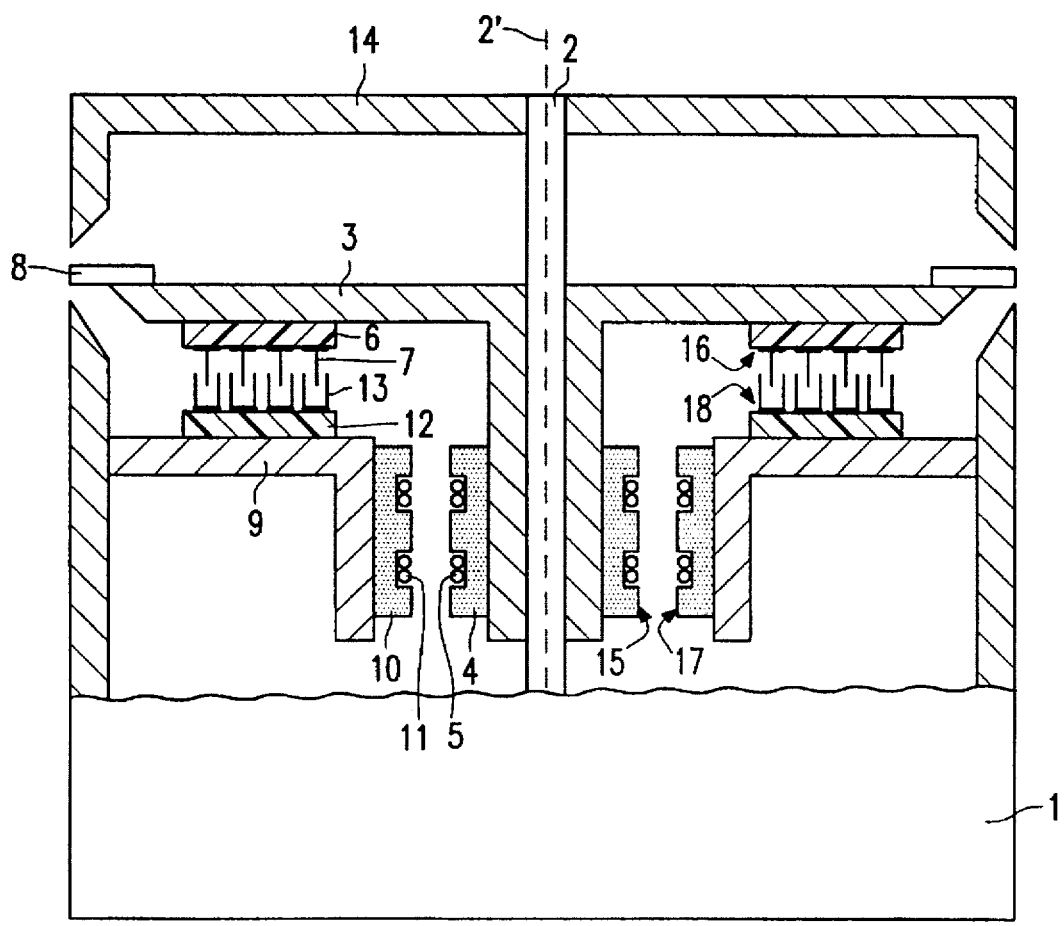
FIG. 1 shows a partial sectional view of a head-drum unit in accordance with the invention.

FIG. 1 is a partial sectional view of a head-drum unit in accordance with the invention. FIG. 1 shows only those details which are relevant for a proper understanding of the invention. Details which are not shown include the drive means, bearing means and tachogenerator. It is know to the expert that these are usually accommodated in a head-drum unit of the present type. FIG. 1 shows an enclosure, comprising a lower drum unit 1 and an upper drum unit 14, which accommodates a supporting member which is rotatable about the axis of rotation 2'. This rotatable rotary supporting member comprises a shaft 2, a head mounting plate 3, a rotor core 4 carrying rotor windings 5, usually in grooves in the rotor core, and a rotor insulator 6 carrying rotor capacitor plates 7. The head mounting plate 3 carries magnetic heads 8. FIG. 1 further shows the stationary part of the head-drum unit, which comprises a stationary rotary supporting member 9, a stator core 10 carrying stator windings 11, usually in grooves in the stator core, and a stator insulator 12 carrying stator capacitor plates 13. The stationary part of the head-drum unit is fixedly connected to the lower drum unit 1. This lower drum unit usually also serves to guide the magnetic tape. The upper drum unit 14 likewise serves to guide the magnetic tape. This upper drum unit 14 can be constructed so as to rotate along with the rotatable supporting member, or so as to be fixedly connected to the lower drum unit, i.e., not rotating along.

The first means for signal transmission in accordance with the invention comprises the rotor windings 5 and the stator windings 11. The second means for signal transmission in accordance with the invention comprises the rotor capacitor plates 7 and the stator capacitor plates 13. It is to be noted that the sectional view shows only two magnetic heads, whereas the signal transmission means are described, by way of example, for four heads. In such an example these four heads include two write heads and two read heads; the write heads are each coupled to a rotor winding 5 and the read heads are each coupled to two rotor capacitor plates 7. Thus, the signal paths for the write signals and the read signals are realized by means of different coupling methods, as a result of which the crosstalk of the write signals to the read signals is low when signals are written on and read from the magnetic tape at the same time.

FIG. 1 further shows the surfaces which are relevant to the invention: A surface 15 is the first wall surface and carries the rotor windings. A surface 16 is the second wall surface and carries the rotor capacitor plates. A surface 17 is the third wall surface and carries the stator windings. A surface 18 is the fourth wall surface and carries the stator capacitor plates.

The following Figures show further embodiments, of which only those parts are shown which are relevant to the invention. The reference numerals in these Figures correspond to the reference numerals used in FIG. 1.

Figure 2:
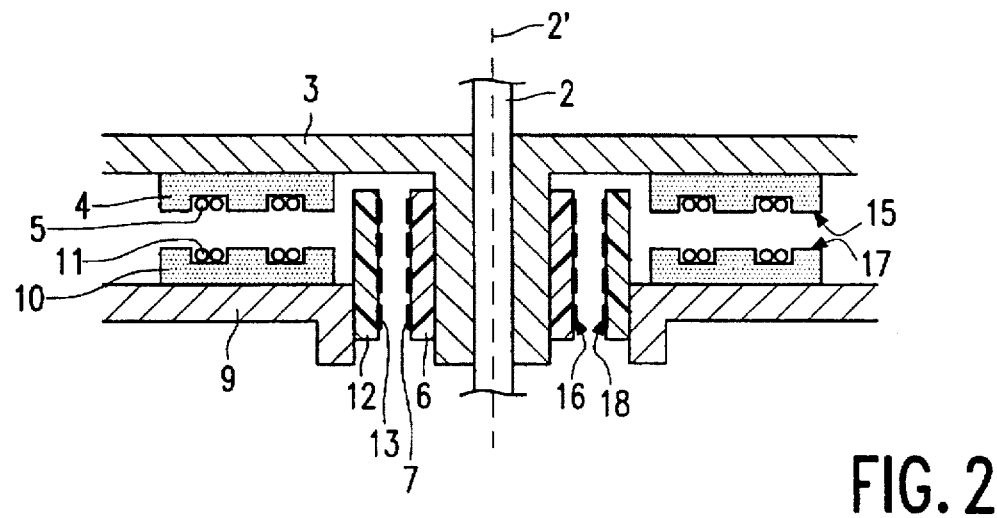
FIG. 2 shows another embodiment of the head-drum unit.

FIG. 2 shows an embodiment provided with a rotary transformer comprising two disc-shaped ferrite cores 4 and 10 disposed perpendicularly to the axis of rotation and carrying windings 5 and 11, respectively, and a rotary capacitor comprising two nested concentric cylindrical insulators 6 and 12, carrying capacitor plates 7 and 13, respectively. This Figure shows a compact construction, which can also be used in the embodiment shown in FIG. 1. This construction can be made even more compact in that an circumferential surface of a ferrite core 4 or 10, which circumferential surface carries no windings, is arranged directly against a insulator 6 or 12, respectively, and is preferably used to support these insulators. It is also possible to arrange one or more capacitor plates directly on this circumferential surface, for example, by sputtering or vapor-deposition of a conductive material, provided that at least at the location of these capacitor plates the ferrite core consists of a non-conductive material, such as for example, NiZn. Many variants to these constructions will be obvious to those skilled in the art and consequently fall within the scope of the invention.

Figure 3:
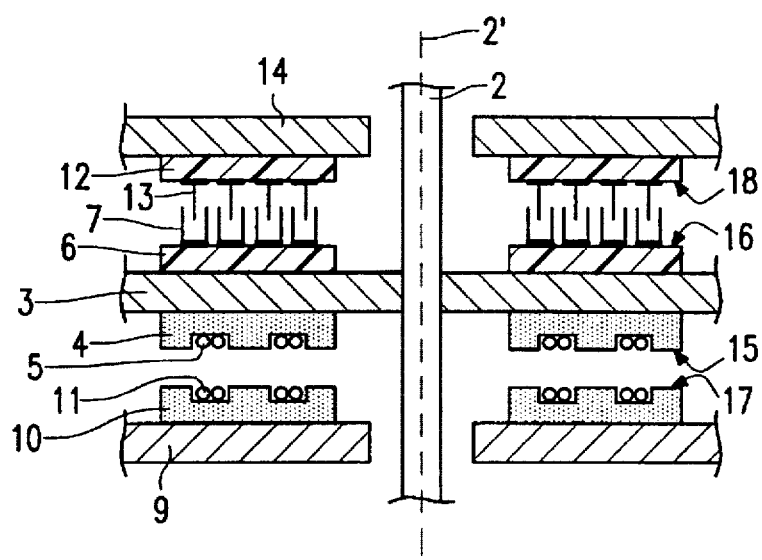
FIG. 3 shows yet another embodiment of the head-drum unit.

FIG. 3 shows an embodiment provided with a rotary transformer comprising two disc-shaped ferrite cores 4 and 10, which are disposed perpendicularly to the axis of rotation and which carry windings 5 and 11, respectively, and a rotary capacitor comprising two disc-shaped insulators 6 and 12, which are disposed perpendicularly to the axis of rotation and which carry capacitor plates 7 and 13, respectively. This embodiment is advantageous in order to obtain a compact construction, particularly when the upper drum unit does not rotate with the rotatable rotary supporting member.

Figure 4A:
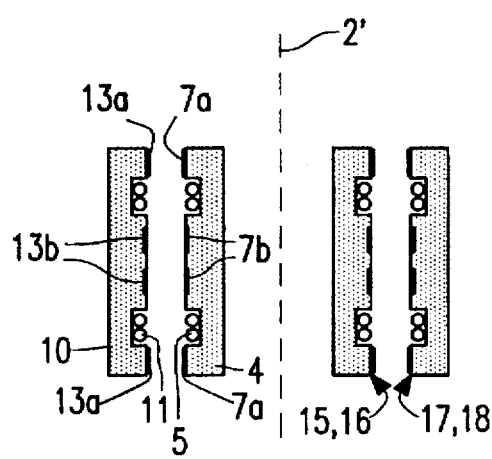
FIG. 4a and FIG. 4b show examples of a combined rotary transformer and capacitor.

FIG. 4a shows a combined rotary transformer and capacitor, the surface 15 coinciding with the surface 16 and the surface 17 coinciding with the surface 18. This combined signal transducer comprises nested concentric cylindrical ferrite cores 4 and 10, carrying windings 5 and 11, respectively, and capacitor plates 7 and 13, respectively. In the present example, the capacitor plates are preferably constructed partly as very thin conductive layers 7a and 13a and partly as thicker conductors 7b and 13b arranged in grooves in the ferrite. The thin conductive layers 7a and 13a can be formed directly on the ferrite, for example, by sputtering or vapor-deposition of a conductive material. Owing to their small thickness, for example, a few micrometers, they influence the inductive signal transmission only to a small extent. The thicker conductors 7b and 13b are disposed in grooves in the ferrite between the windings of different heads; they reduce the crosstalk between these windings because they acts as short-circuit rings.

Figure 4B:
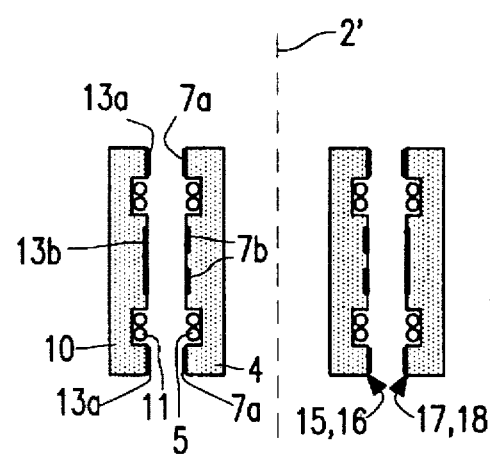

FIG. 4b shows a combined signal transducer whose construction is the same as shown in FIG. 4a, except for the fact that two stator capacitor plates have been combined to a single stator capacitor plate 13b. This combined capacitor plate can be used in the signal return path of a plurality of heads. Combining the stator capacitor plates enables a cheaper and more compact construction to be obtained. The same also holds for combining the rotor capacitor plates. These measures can also be applied to the other constructions.

Figure 5:
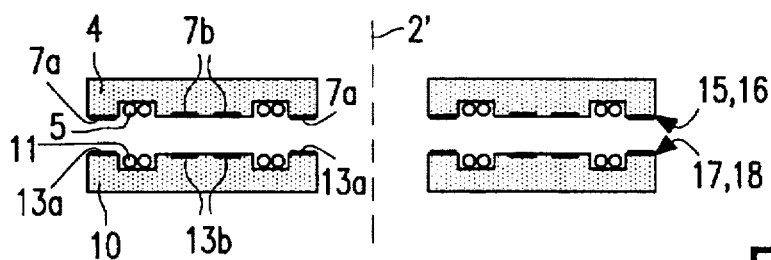
FIG. 5 shows another example of a combined rotary transformer and capacitor.

FIG. 5 shows another example of a combined rotary transformer and capacitor. This combined signal transducer has the same features as the embodiments in accordance with FIG. 4 but it comprises disc-shaped ferrite cores 4 and 10 which are disposed perpendicularly to the axis of rotation and which carry windings 5 and 11, respectively, and capacitor plates 7 and 13, respectively.

Thus, the invention provides a magnetic-tape recording/ reproducing apparatus, particularly an apparatus constructed for simultaneously reading and writing signals on the tape. This apparatus comprises an improved head-drum unit which provides a high degree of isolation between the write and read signals by the use of a rotary transformer for the write signals and a rotary capacitor for the read signals. This high signal isolation can be achieved even in the case of a high degree of miniaturization. In an example, the capacitor plates are disposed on the ferrite cores of the rotary transformer, for example, between the windings connected to the various write heads.

It is to be noted that the invention is not limited to the preferred embodiments described herein. Those skilled in the art will be capable of devising variants within the scope of the invention as defined hereinbefore and in the Claims given hereinafter.

What is claimed is:

1. A head-drum unit for use in a magnetic-tape recording/reproducing device, the head-drum unit having a rotatable supporting member and a stationary part, characterized in that the head-drum unit comprises first and second means for signal transmission between the stationary part and a magnetic head arranged on the supporting member, the first means for signal transmission transmitting signals by means of a substantially inductive coupling, and the second means for signal transmission transmitting signals by means of a substantially capacitive coupling.

2. A magnetic-tape recording/reproducing device of the helical-scan type, comprising a head-drum unit having a rotatable supporting member and a stationary part, characterized in that the head-drum unit comprises first and second means for signal transmission between the stationary part and a magnetic head arranged on the supporting member, the first means for signal transmission transmitting signals by a substantially inductive coupling, and the second means for signal transmission transmitting signals by a substantially capacitive coupling.

3. A magnetic-tape recording/reproducing device as claimed in claim 2, wherein the rotatable supporting member has a first and a second wall surface, and the stationary part of the head-drum unit has a third and a fourth wall surface, characterized in that the first means for signal transmission comprises a rotor winding arranged on the first wall surface and a stator winding arranged on the third wall surface such that the rotor winding faces the stator winding with which it cooperates, and the second means for signal transmission comprises a rotor capacitor plate arranged on the second wall surface and a stator capacitor plate arranged on the fourth wall surface such that the rotor capacitor plate faces the stator capacitor plate with which it cooperates.

4. A magnetic-tape recording/reproducing device as claimed in claim 1, characterized in that the rotatable supporting member carries at least a first and a second magnetic head, the first magnetic head being coupled to the first means for signal transmission, and the second magnetic head being coupled to the second means for signal transmission, wherein one of the first and second magnetic heads is a read head and the other of the first and second magnetic heads is a write head.

5. A magnetic-tape recording/reproducing device as claimed in claim 4, wherein the rotatable supporting member has a first and a second wall surface, and the stationary part of the head-drum unit has a third and a fourth wall surface, characterized in that the first means for signal transmission comprises a rotor winding arranged on the first wall surface and a stator winding arranged on the third wall surface such that the rotor winding faces the stator winding with which it cooperates, and the second means for signal transmission comprises a rotor capacitor plate arranged on the second wall surface and a stator capacitor plate arranged on the fourth wall surface such that the rotor capacitor plate faces the stator capacitor plate with which it cooperates.

6. A magnetic-tape recording/reproducing device as claimed in claim 4, characterized in that the first magnetic head is the write head, and the second magnetic head is the read head.

7. A magnetic-tape recording/reproducing device as claimed in claim 6, wherein the rotatable supporting member has a first and a second wall surface, and the stationary part of the head-drum unit has a third and a fourth wall surface, characterized in that the first means for signal transmission comprises a rotor winding arranged on the first wall surface and a stator winding arranged on the third wall surface such that the rotor winding faces the stator winding with which it cooperates, and the second means for signal transmission comprises a rotor capacitor plate arranged on the second wall surface and a stator capacitor plate arranged on the fourth wall surface such that the rotor capacitor plate faces the stator capacitor plate with which it cooperates.

8. A magnetic-tape recording/reproducing device as claimed in claim 7, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

9. A magnetic-tape recording/reproducing device as claimed in claim 7, characterized in that imaginary surfaces in which the first and the second wall surfaces lie, substantially coincide, and/or imaginary surfaces in which the third and the fourth wall surfaces lie, substantially coincide.

10. A magnetic-tape recording/reproducing device as claimed in claim 9, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

11. A magnetic-tape recording/reproducing device as claimed in claim 7, characterized in that the first and the third wall surfaces lie in substantially concentric cylindrical imaginary surfaces, and/or the second and the fourth wall surfaces lie in substantially concentric cylindrical imaginary surfaces.

12. A magnetic-tape recording/reproducing device as claimed in claim 1, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

13. A magnetic-tape recording/reproducing device as claimed in claim 11, characterized in that the imaginary surfaces in which the first and the second wall surfaces lie, substantially coincide, and/or the imaginary surfaces in which the third and the fourth wall surfaces lie, substantially coincide.

14. A magnetic-tape recording/reproducing device as claimed in claim 13, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

15. A magnetic-tape recording/reproducing device as claimed in claim 7, characterized in that the first and the third wall surfaces lie in substantially parallel imaginary surfaces perpendicular to the direction of rotation of the rotatable supporting member, and/or the second and the fourth wall surfaces lie in substantially parallel imaginary surfaces perpendicular to the direction of rotation of the rotatable supporting member.

16. A magnetic-tape recording/reproducing device as claimed in claim 15, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

17. A magnetic-tape recording/reproducing device as claimed in claim 15, characterized in that the imaginary surfaces in which the first and the second wall surfaces lie, substantially coincide, and/or the imaginary surfaces in which the third and the fourth wall surfaces lies substantially coincide.

18. A magnetic-tape recording/reproducing device as claimed in claim 17, characterized in that the head-drum unit comprises a rotor core and a stator core of a ferromagnetic material, the rotor core serving as a support for the rotor winding and the stator core serving as a support for the stator winding, the rotor core further serving as a support for the rotor capacitor plate and/or the stator core further serving as a support for the stator capacitor plate.

19. A magnetic-tape recording/reproducing device as claimed in claim 18, characterized in that at least a part of the rotor core and/or the stator core is made of a substantially non-conductive ferromagnetic material, and the rotor capacitor plate and/or the stator capacitor plate is made of a conductive material applied, at least partly, to the substantially non-conductive ferromagnetic material.

20. A magnetic-tape recording/reproducing device as claimed in claim 19, characterized in that the first means for signal transmission comprises at least two rotor windings and two stator windings, a rotor capacitor plate being interposed between the rotor windings, and a stator capacitor plate being interposed between the stator windings.

\* \* \* \* \*